(12) United States Patent
Gassewitz et al.

(10) Patent No.: US 7,822,868 B2
(45) Date of Patent: Oct. 26, 2010

(54) METHOD AND APPARATUS FOR TARGETED CONTENT DELIVERY BASED ON RSS FEED ANALYSIS

(75) Inventors: Mike Gassewitz, Ottawa (CA); Denny Lee, Ottawa (CA); Rob Gaudet, Carp (CA)

(73) Assignee: Alcatel Lucent, Paris (FR)

( * ) Notice: Subject to any disclaimer, the term of this patent is extended or adjusted under 35 U.S.C. 154(b) by 310 days.

(21) Appl. No.: 12/010,804

(22) Filed: Jan. 30, 2008

(65) Prior Publication Data

US 2009/0193097 A1 Jul. 30, 2009

(51) Int. Cl.
G06F 15/16 (2006.01)

(52) U.S. Cl. .......................... 709/231; 709/217; 709/219

(58) Field of Classification Search .................. 709/217, 709/231, 219; 725/34; 707/5
See application file for complete search history.

(56) References Cited

U.S. PATENT DOCUMENTS

2003/0149975 A1* 8/2003 Eldering et al. ............... 725/34
2008/0172370 A1* 7/2008 Farouki ........................ 707/5
2009/0042549 A1* 2/2009 Lee ............................. 709/246
2009/0171760 A1* 7/2009 Aarnio et al. ............... 709/219

* cited by examiner

Primary Examiner—Ramy M Osman
(74) Attorney, Agent, or Firm—Kramer & Amado, P.C.

(57) ABSTRACT

A system and related method for targeted content delivery based on RSS feed analysis, including one or more of the following: a behavior analyzer that formulates a behavioral profile of a user of a terminal device who requests an RSS feed and receives same through the terminal device; an infrastructure that establishes behavioral profile data regarding the user and delivers targeted content to the user; and a network in communication with the terminal device, the network matching one or more flows of the RSS feed to known protocol signatures, collecting summary descriptive information embedded in the one or more flows of the RSS feed, and correlating the collected information with a subsequent content request.

26 Claims, 4 Drawing Sheets

METHOD AND APPARATUS FOR TARGETED CONTENT DELIVERY BASED ON RSS FEED ANALYSIS

BACKGROUND OF THE INVENTION

1. Field of the Invention

This invention relates generally to the dissemination of targeted information through communications networks.

2. Description of Related Art

The Internet has become one of the main sources of disseminating information. Real simple syndication (RSS) is a phrase that refers to a method of subscribing to new feeds or to information provided by special interest groups. RSS was designed and popularized in recent years. RSS functions as an easy to use method of subscribing to information feeds.

The particular information feed(s) selected by a given user tend to reveal the user's specific interest(s). An awareness of such interest(s) could be used to deliver targeted content such as an advertisement. However, there is not currently an ability to monitor and analyze RSS feeds for the purpose of identifying a given user's specific interest(s) based on the feed(s) selected by the user in order to establish targeted content delivery to the user. Thus, there is a need for an ability to monitor and analyze RSS feed(s) in order to identify specific interest(s) of users based on RSS feed(s) selected by the user.

Deep packet inspection (DPI) technology has been deployed by information carriers to monitor Internet traffic for the purposes of traffic control and engineering. In some instances, DPI is used for the purposes of targeted content delivery. However, DPI has not been used to monitor and process RSS feed information. Likewise, there is no system or method for inferring and formulating user demographic and/or behavioral profile information based on an analysis of RSS feed information.

The foregoing objects and advantages of the invention are illustrative of those that can be achieved by the various exemplary embodiments and are not intended to be exhaustive or limiting of the possible advantages which can be realized. Thus, these and other objects and advantages of the various exemplary embodiments will be apparent from the description herein or can be learned from practicing the various exemplary embodiments, both as embodied herein or as modified in view of any variation which may be apparent to those skilled in the art. Accordingly, the present invention resides in the novel methods, arrangements, combinations and improvements herein shown and described in various exemplary embodiments.

SUMMARY OF THE INVENTION

In light of the present need for a method and apparatus for targeted content delivery based on RSS feed analysis, a brief summary of various exemplary embodiments is presented. Some simplifications and omission may be made in the following summary, which is intended to highlight and introduce some aspects of the various exemplary embodiments, but not to limit its scope. Detailed descriptions of a preferred exemplary embodiment adequate to allow those of ordinary skill in the art to make and use the invention concepts will follow in later sections.

In addition to the RSS publisher-to-subscriber feeds, other proprietary mechanisms exist for establishing information feeds over the Internet. However, the RSS standard has gained a considerable mainstream acceptance in recent years. In fact, the RSS standard is now in popular usage. For example, most modern browser applications have an RSS reader built in.

Accordingly, various exemplary embodiments exploit the current popularity of RSS for the purpose of user profiling and for the purpose of delivering targeted or otherwise personalized content, such as advertising.

Accordingly, various exemplary embodiments are a system for targeted content delivery based on real simple syndication feed analysis, including one or more of the following: a behavior analyzer that formulates a behavioral profile of a user of a terminal device, the user of the terminal device requesting an RSS feed through the terminal device and receiving the requested feed at the terminal device; a targeted content delivery infrastructure that establishes behavioral profile data regarding the user and delivers targeted content to the user; a packet-based communication network in communication with the terminal device, the packet-based communication network including a behavioral information collector, the behavioral information collector including a feed information collector, a protocol signature identifier, and a real simple syndication interest correlator, wherein the protocol signature identifier monitors one or more flows, compares the one or more flows to known protocol signatures and identifies one or more matches between the one or more flows and the known protocol signatures, the feed information collector collects information embedded in the RSS feed that describes the feed in a summary fashion, and the RSS interest correlator correlates the collected information with a subsequent content request.

Various exemplary embodiments also typified by one or more of the following characterstics: the feed information collector includes storage that stores the collected information; the RSS interest correlator includes storage that stores correlations between the collected information the subsequent content request; a behavioral profile database in which the behavioral profile of the user of the terminal device is stored; the behavioral profile data includes a demographic, psychographic and/or an interest of the user; the targeted content is an advertisement; the targeted content is delivered via the Internet, including Internet protocol based video or via a mobile or other wireless communications network; the information collected by the feed information collector, also referred to herein as useful content or stored useful content, is a title, a synopsis or a truncated summary of the one or more flows of the RSS feed, and includes a uniform resource locator (URL) indicating a location where a full content of the RSS feed is located; the RSS interest correlator matches stored useful content with the subsequent content request and flags the subsequent content request with a flag, such as a numerical value or a label indicating a degree of interest of the user, based on the matches between the one or more flows of the RSS feed and the known protocol signatures determined by the protocol signature identifier; the RSS interest correlator further acts as an associated inference analyzer that assists the behavior analyzer as a co-processor to perform a semantic analysis or an inference process that involves a URL-to-interest inference lookup.

Likewise, various exemplary embodiments are a method of targeted content delivery based on RSS feed analysis, including one or more of the following: collecting relevant user traffic; comparing one or more collected traffic flows of the relevant user traffic to a set of known protocol signatures; determining that a match exists between the relevant user traffic and the set of known protocol signatures; identifying a flow sequence of RSS information exchange between an RSS reader application and an RSS feed server; monitoring and analyzing the RSS information, including parsing; identifying and extracting useful contents embedded in the RSS feed; storing the useful contents embedded in the RSS feeds; correlating the stored useful contents with subsequent content requests; determining that a match exists between the stored useful contents and the subsequent information requests; formulating a user behavior profile of the user; delivering targeted content to the user based on the user behavior profile.

In various exemplary embodiments, correlating includes periodically pushing stored information regarding one or more interests of the user to a behavior analyzer. In other exemplary embodiments, correlating includes the behavior analyzer periodically pulling stored information regarding one or more interests of the user. In various exemplary embodiments correlating includes both pushing and pulling the stored information.

BRIEF DESCRIPTION OF THE DRAWINGS

In order to better understand various exemplary embodiments, reference is made to the accompanying drawings, wherein.

DETAILED DESCRIPTION OF THE PREFERRED EMBODIMENTS OF THE INVENTION

Figure 1:
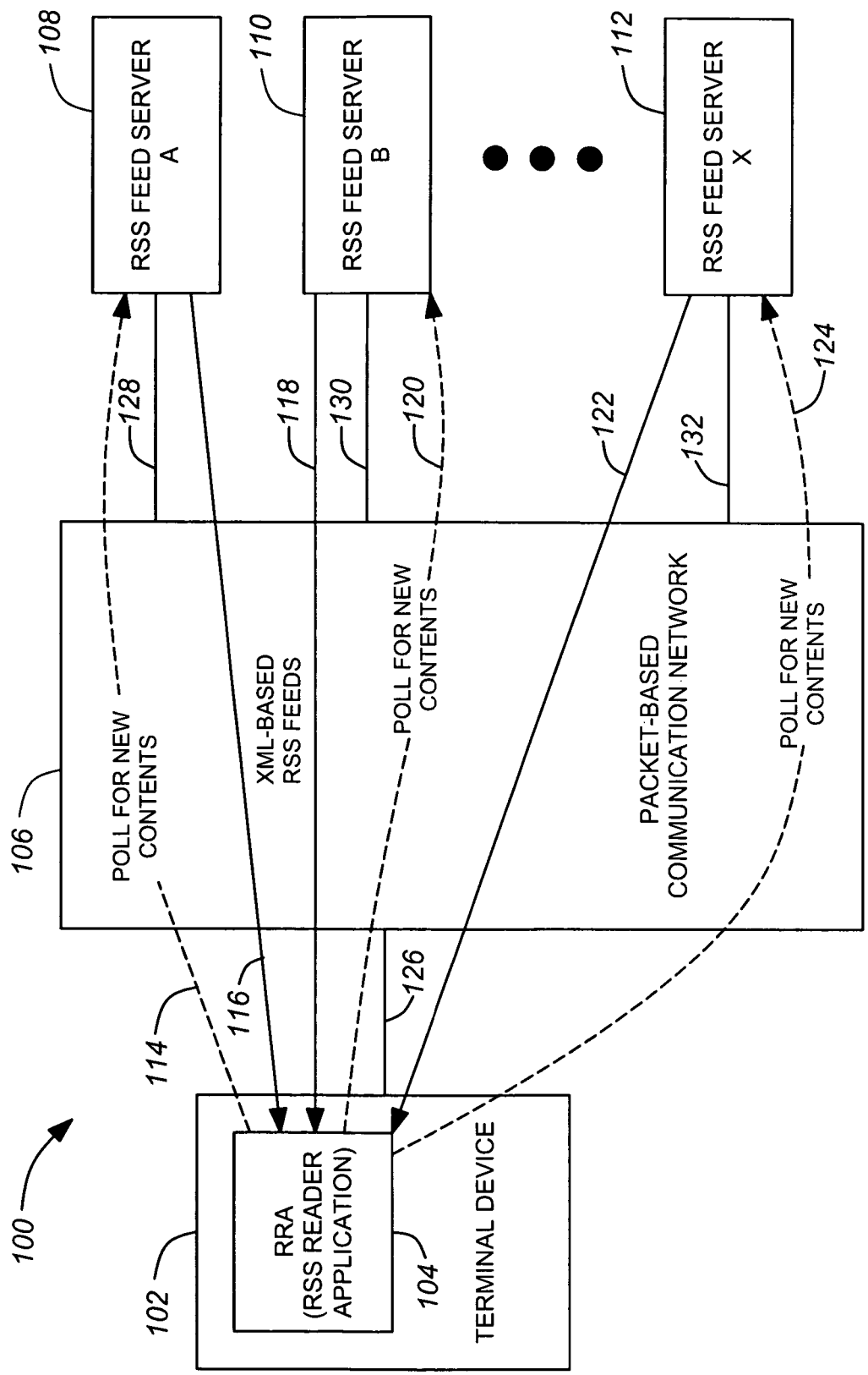
FIG. 1 is a schematic diagram of a first exemplary embodiment of a system for targeted content delivery based on RSS feed analysis.

Referring now to the drawings, in which like numerals refer to like components or steps, there are disclosed broad aspects of various exemplary embodiments.

FIG. 1 is a schematic diagram of a first exemplary embodiment of a system 100 for targeted content delivery based on RSS feed analysis. Exemplary system 100 depicts a basic communication framework. The primary elements in system 100 are terminal device 102, packet-based communication network 106 and RSS feed servers (RFS) 108, 110, 112.

As depicted in system 100, it should be understood that RSS feed server A 108, RSS feed server B 110 and RSS feed server X 112 are intended to represent any number of RSS feed servers. Each RSS feed server 108, 110, 112 is in communication with the packet-based communication network 106. Accordingly, RSS feed server A 108 is in communication with packet-based communication network 106 by way of communication path 128. Similarly, RSS feed server B 110 is in communication with packet-based communication network 106 by way of communication path 130. Likewise, RSS feed server X 112 is in communication with packet-based communication network 106 by way of communication path 132.

The terminal device 102 is also in communication with the packet-based communication network 106 by way of communication path 126. The terminal device includes an RSS reader application (RRA) 104.

In various exemplary embodiments, packet-based communications network 106 is a network such as the IP-based Internet. In various exemplary embodiments, the packet-based communication network 106 is used to provide routing of packets to appropriate destinations. Accordingly, in various exemplary embodiments, the XML-based RSS feeds 116, 118, 122 are transported using http-over-TCP-over-IP. This is further discussed below.

In various exemplary embodiments, the RSS feed servers (RFS) 108, 110, 112 are web servers operated by information publishers. In various exemplary embodiments, RFS 108, 110, 112 are web serving functions as part of the publishers overall website or as part of a content provider infrastructure.

As implemented in exemplary system 100, RSS is a web feed mechanism utilized for information dissemination between an information publisher and an information subscriber. In various exemplary embodiments, the information publisher is an online news source or other online content provider. In various exemplary embodiments, the information subscriber is an Internet user interested in subscribing to the online news source or other online content provided by the content provider.

In various exemplary embodiments, RSS information is exchanged between the information subscriber and the information publisher based on the XML language. Accordingly, in system 100, the terminal device 102 is a customer premise based client computing device. Likewise, in various exemplary embodiments, the packet-based communication network 106 is the Internet. In various exemplary embodiments, communication path 126 is a wireless communication path. In other exemplary embodiments, the communication path 126 is a fixed communication path such as a DSL or cable-modem based interconnection.

Accordingly, it should be apparent that, in various exemplary embodiments, the terminal device 102 is a personal computer. In other exemplary embodiments, the terminal device 102 is a wireless device such as a mobile telephone or a personalized data assistant (PDA).

In various exemplary embodiments, the RRA 104 is a software function residing within the terminal device 102. In various exemplary embodiments, the RRA 104 performs one or more of the functions further described below in connection with FIG. 2. In various exemplary embodiments, the RRA 104 is a stand alone software application. In other exemplary embodiments, the RRA 104 is a smaller part of a larger application, such as an Internet browser application.

System 100 depicts several exemplary communications between the various components of the system 100. In particular, the terminal device 102 polls RSS feed server A 108 for new contents via path 114. In response to the poll 114, RSS feed server A 108 returns one or more XML-based RSS feeds 116. Similarly, the RRA 104 sends poll for new contents 120 to RSS feed server B 110. RSS feed server B 110 returns XML-based RSS feed 118 to RRA 104 in response to poll 120. Similarly, RRA 104 sends poll 124 to RSS feed server X 112, and RSS feed server X 112 sends XML-based RSS feed 122 back to RRA 104 in response to poll 124.

It should be understood that poll 114 and feed 116 are sent via communication path 126 and communication path 128. Similarly, it should be understood that poll 120 and feed 118 are sent via communication path 126 and communication path 130. Likewise, it should be understood that poll 124 and feed 122 are sent via communication path 126 and communication path 132. Accordingly, polls 114, 120, 124 and feeds 116, 118, 122 all travel through the packet-based communication network 106. Further, it should be apparent, that polls 114, 120, 124 and feeds 116, 118, 122 correspond to various steps further described below in connection with FIG. 2.

In various exemplary embodiments, there are three main sessions of information flow in the basic RSS communication framework. A first type of information flow is the polling represented by polls 114, 120, 124. In various exemplary embodiments, once configured, the RRA 104 periodically polls the feed locations 108, 110, 112 for any new content.

The second main session of information flow is the transmission of the XML-based RSS feeds 116, 118, 122. Accordingly, when polled, the RFS 108, 110, 112 disseminate the requested content through the XML-based feeds 116, 118, 122 to the RRA 104.

Figure 2:
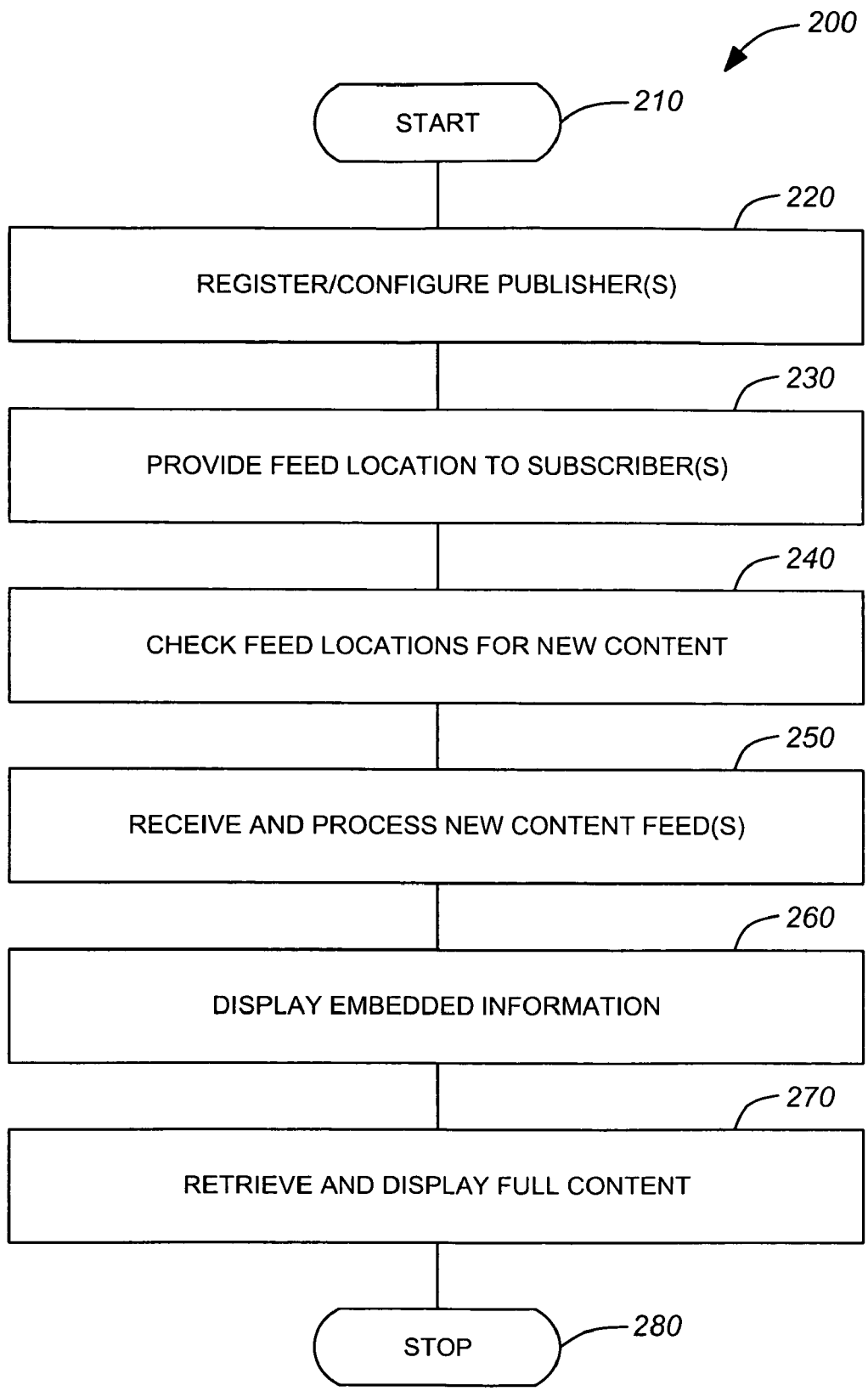
FIG. 2 is a flow chart of a first exemplary embodiment of a method for targeted content delivery based on RSS feed analysis.

FIG. 2 is a flow chart of a first exemplary embodiment of a method 200 for targeted content delivery based on RSS feed analysis. Method 200 starts in step 210 and continues to step 220.

In step 220, one or more interested publishers are registered and/or configured as feed locations. In various exemplary embodiments, the feed locations registered and/or configured in step 220 correspond to RSS feed server A 108, RSS feed server B 110 and RSS feed server X 112.

Following step 220, method 200 proceeds to step 230. In step 230, the feed locations are provided to the interested subscribers. In various exemplary embodiments, this corresponds to a communication from RSS feed server A 108, RSS feed server B 110, and/or RSS feed server X 112 to the RRA 104 of terminal device 102. In various exemplary embodiments, feed locations are provided to subscribers later than depicted in the method 200.

In other exemplary embodiments, the step providing feed locations to subscribers is repeated later in the method 200 as new feed locations are identified, registered and/or configured. In various exemplary embodiments, when polled by the RRA 104, as indicated by polls 114, 120, 124, RSS feed server A, RSS feed server B and/or RSS feed server X respond with new XML feeds 116, 118, 122 when new content has arisen since the last occurrence of polls 114, 120, 124.

Following step 230, the method 200 proceeds to step 240. In step 240, the feed locations registered and/or configured in step 220, and provided in step 230, are checked for new content. It should be understood that, as used to in, the term content denotes any type of online material, including, but not limited to, for example, a news article or a media file.

Following step 240, the method 200 proceeds to step 250. In step 250, the XML-based RSS feeds 116, 118, 122 are received and processed by the RRA 104. After the XML-based RSS feeds 116, 118, 122 are received and processed by the RRA 104 in step 250, the method 200 proceeds to step 260.

In step 260, information embedded in the XML-based RSS feeds 116, 118, 122 is displayed to the user of the terminal device 102. In various exemplary embodiments, step 260 corresponds to displaying a synopsis or other truncated summary of the content. For example, in various exemplary embodiments, a title of the content is displayed in step 260.

Following step 260, the method 200 proceeds to step 270. In step 270, the full content or article of the XML-based RSS feeds 116, 118, 122 is retrieved and displayed on a display of the terminal device 102.

Accordingly, in various exemplary embodiments, the initial feeds 116, 118, 122 only contain the title for the article or some other short description or synopsis to be displayed in step 260, and, additionally, a URL indicating an Internet location for the full main piece of the content or article such as the full length version of a news story. Thus, in various exemplary embodiments of step 270, additional communications occur through the packet-based communications network 106 in order to retrieve and display the full content or article through the RRA 104. It should be apparent that, such embodiments are applicable when the content or article in question is an Internet web page.

Following step 270, the method 200 proceeds to step 280 where the method 200 stops.

Figure 3:
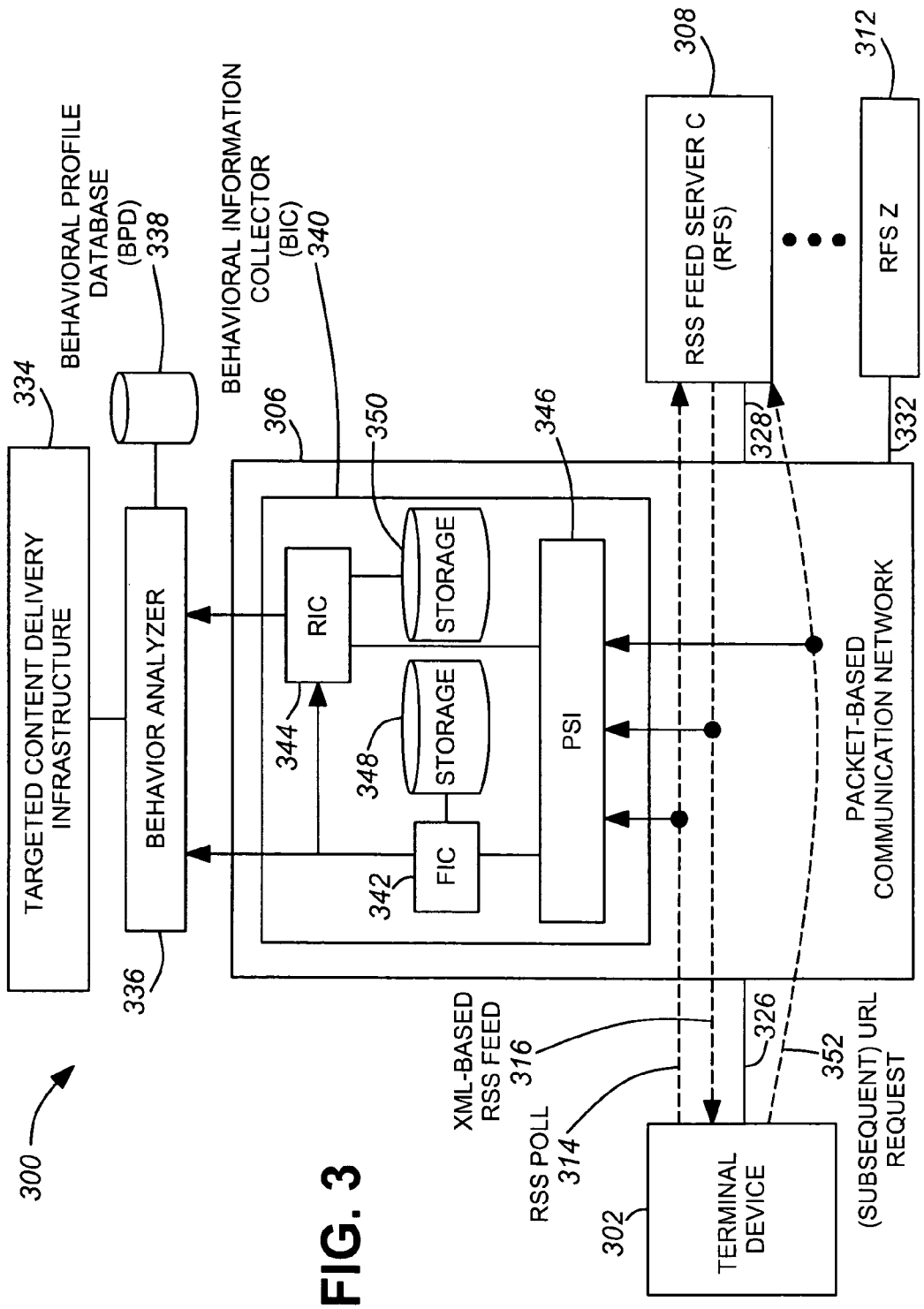
FIG. 3 is a schematic diagram of a second exemplary embodiment of a system for targeted content delivery based on RSS feed analysis.

FIG. 3 is a schematic diagram of a second exemplary embodiment of a system 300 for targeted content delivery based on RSS feed analysis. The general components of system 300 include terminal device 302, packet-based communication network 306 and RFS C 308 through RFS Z 312.

Terminal device 302 is connected to packet-based communication network 306 by way of communication path 326. RFS C 308 is connected to packet-based communication network 306 by way of communication path 328. RFS Z 312 is connected to packet-based communication network 306 through communication path 332.

The terminal device 302 sends RSS poll 314 to RFS C 308 through network 306. RFS C 308 returns XML-based RSS feed 316 to terminal device 302 in response to poll 314 through packet-based communication network 306. It should be apparent that, elements 302, 306, 308, 312, 314, 316, 326, 328 and 332 in system 300 correspond to elements 102, 106, 108, 112, 114, 116, 126, 128 and 132, described in greater detail above in connection with system 100, respectively.

Accordingly, it should be apparent that system 300 is based on system 100. However, it should also be apparent that system 300 contains additional elements not depicted in system 100. These elements include behavioral information collector (BIC) 340, behavioral analyzer 336, behavioral profile database (BPD) 338, targeted content delivery infrastructure 334, and subsequent URL request 352. Further, BIC 340 includes feed information collector (FIC) 342 having storage 348, RSS interest correlator (RIC) 344 having storage 350 and protocol signature identifier (PSI) 346.

The BIC 340 is used to monitor and collect relevant user traffic for the purpose of further profiling. In various exemplary embodiments, BIC 340 is deployed inline. In other exemplary embodiments, the BIC 340 is deployed offline in an adjunct manner with respect to the communications traffic. It is believed that embodiments wherein the BIC 340 is employed offline in an adjunct manner offer improved network survivability. In various exemplary embodiments, the BIC 340 utilizes DPI technology or is part of a DPI platform.

PSI 346 is used to monitor and match inline traffic flow against a set of known protocol signatures. In this manner, PSI 346 is used to identify various protocols and corresponding RSS flow(s). For example, in various exemplary embodiments, PSI 346 is used to identify a flow sequence of the RSS information exchange between an RRA in terminal device 302 and RFS 308, 312. In various exemplary embodiments, the references to known protocol signatures are intended to include everything under layer seven in seven stack communications layers where the seventh layer is the application layer on top of which the application sits.

Once an RSS exchange is identified, the XML-based RSS feed 316 is monitored and analyzed by the FIC 342. In various exemplary embodiments, FIC 342 includes an XML-parsing function in which useful content embedded in the XML-based feed 316 are identified, extracted and stored.

In various exemplary embodiments, the information extracted by the FIC 342 contains 1) a title of the article or content of the flow(s), 2) a synopsis of the main article or content of the flow(s), and 3) a "referred to" URL for retrieving a corresponding main article or content of the flow(s). As used herein, the term article refers to a news article on the webpage whereas the term content refers generically to any media content including also a piece of music, a video clip, and so on. In various exemplary embodiments, the stored information is distributed on a per user or subscriber basis.

The RIC 344 is part of the overall function of the BIC 340 in various exemplary embodiments. Thus, in various exemplary embodiments, the RIC 344 is used to correlate information regarding XML-based feed 316 that was delivered and stored in the FIC 342 with the subsequent URL request 352.

RIC storage 350 stores the matched URL request against previously delivered referred URLs on a per subscriber basis. In various exemplary embodiments, the information stored in RIC storage 350 is periodically pushed to the behavioral analyzer 336. In various exemplary embodiments, the information stored in RIC storage 350 is periodically pulled or requested by the behavior analyzer 336. In various exemplary embodiments, the information stored in RIC storage 350 is both pushed and pulled.

Typically, information in RSS feed 316 is stored and displayed by the RRA of the terminal device 302 for a certain period of time. Usually, after the expiration of the predetermined period of time, all information is removed from the reader of the terminal device 302.

In various exemplary embodiments, a user of the terminal device 302 is able to choose to read syndicated information, including a title or article synopsis, using the RRA of the terminal device 302 at any time. In various exemplary embodiments, where certain items are of specific interest to the user of the terminal device 302, that user selects an item of interest by clicking on it. In various exemplary embodiments, this generates a URL request 352 to the main article or piece of content.

In various exemplary embodiments, the RIC 344 includes a functionality able to correlate the URL request 352 against previously delivered RSS feeds 316 and the information contained therein. In various exemplary embodiments, this correlation is performed by the RIC 344 using a matching function in which the subsequent URL request 352 is matched against stored information in FIC storage 348.

As described above, FIC storage 348 contains the title of the article, a synopsis of the main article or content of the flow(s), and a referred to URL to retrieve the main article or content. When a match is determined, the specific URL request is logged and flagged by the RIC 344 for importance of correlated interest. In various exemplary embodiments, the flag is represented as a label or as a numeric value that indicates a degree of interest of a user of the terminal device 302.

The behavior analyzer 336 is used to formulate a user behavior profile based on the behavior information collected as described above. One such set of information includes the data collected from the FIC 342 and the RIC 344. In various exemplary embodiments, this information is used by the behavioral analyzer 336 to infer, formulate and reinforce a view of a demographic, psychographic and/or relevant interest of the user of the terminal device 302.

In various exemplary embodiments, the behavior analyzer 336 periodically retrieves the stored RSS feed information from the storage 348 of FIC 342. In various exemplary embodiments, the retrieved RSS feed information is used to infer, formulate and reinforce the general interest profile of the user of the terminal device 302. In various exemplary embodiments, the behavior analyzer 336 also retrieves, through the RIC 344, the stored URL matches that indicate strong and specific interest(s) of the user of the terminal device 302.

In various exemplary embodiments, the RIC 344 also performs a function of looking up a URL-to-interest inference. For example, a selection of a SONY PSP game results in an inference of a SONY PSP gaming format from the selection of the title of the SONY PSP game.

In various exemplary embodiments, the RIC 344 acts as an associated inference analyzer assisting the behavior analyzer 336 in a capacity analogous to that of a co-processor. Accordingly, interest(s) of the user of the terminal device 302 are first inferred from the RSS feed(s) 316. In various exemplary embodiments, this inference process involves a semantic analysis. In other exemplary embodiments, as described above, the inference process involves a URL-to-interest inference lookup.

The targeted content delivery infrastructure 344 is utilized to establish profile data on the user of the terminal device 302 and to delivery highly relevant and personalized contents to the user of the terminal device 302. As mentioned above, one type of personalized content includes an advertisement.

In various exemplary embodiments, the infrastructure described above matches the most suitable product recommendation or advertisement against the mentioned demographic, psychographic and other relevant-interest data contained within the behavioral profile database (BPD) 338. In various exemplary embodiments, the personalized content such as the advertisement is delivered via a partner web publisher portal or other targeted means such as a mobile or other wireless communications network, Internet protocol television (IPTV) or other Internet protocol based video, and so on.

The various communications between elements described in connection with system 300 are depicted in FIG. 3 by lines and arrows. Various functions described above for the various elements of system 300 will be further described below in connection with FIG. 4.

Figure 4:
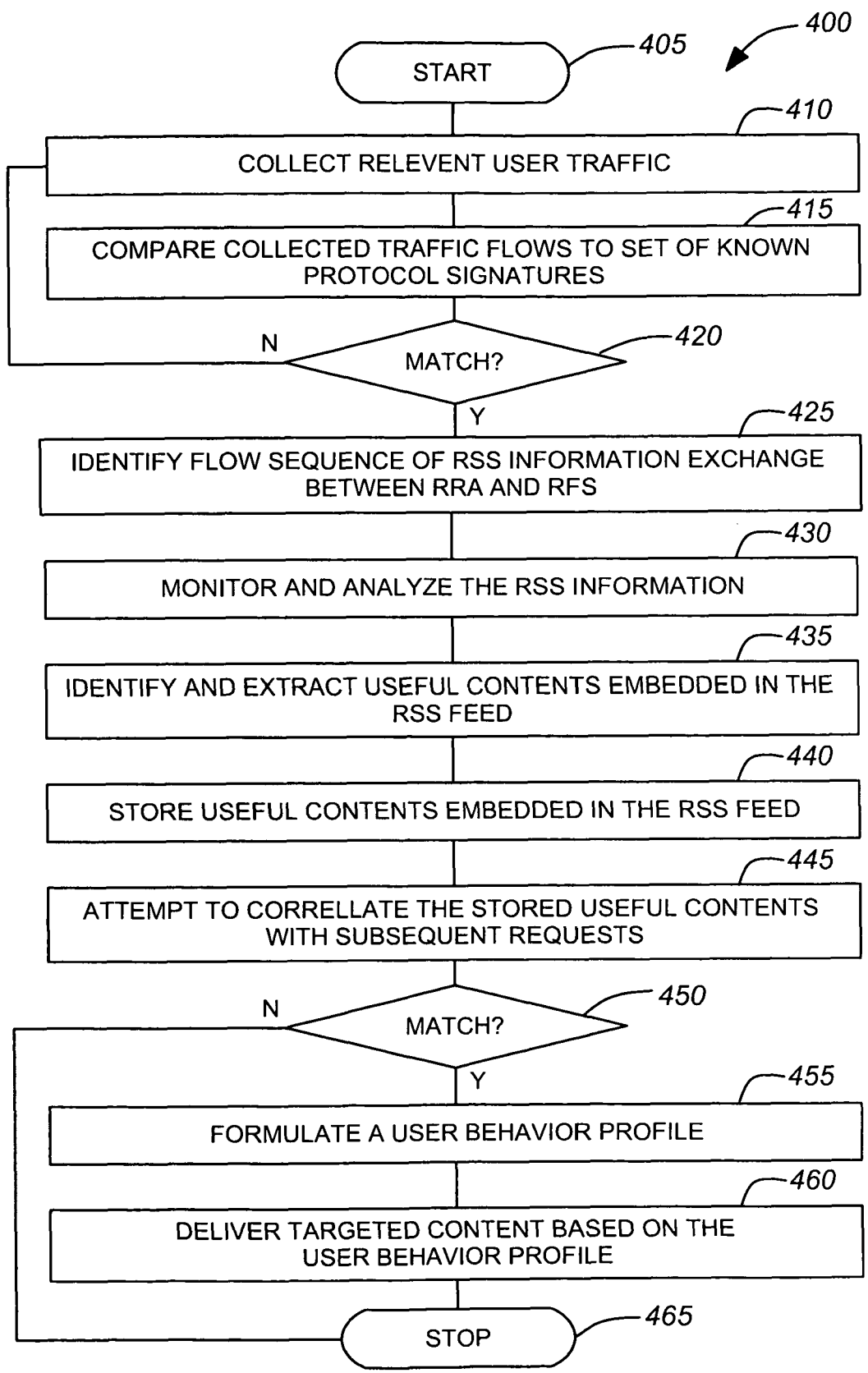
FIG. 4 is a flow chart of a second exemplary embodiment of a method for targeted content delivery based on RSS feed analysis.

FIG. 4 is a flow chart of a second exemplary embodiment of a method 400 for targeted content delivery based on RSS feed analysis. Method 400 starts in step 405 and continues to step 410. In step 410, the relevant user traffic is monitored and collected by the BIC 340. Following step 410, the method 400 proceeds to step 415.

In step 415, the PSI 346 compares collected traffic flows to a set of known protocol signatures. Following step 415, the method 400 proceeds to step 420 where a determination is made whether a match exists between the collected traffic flows and any element in the set of known protocol signatures. When a determination is made in step 420 that no match exists, the method 400 returns to step 410 where the collection of relevant user traffic is continued.

When a determination is made in step 420 that a match exists between a collected traffic flow and a member of the set of known protocol signatures, the method 400 proceeds to step 425. In step 425, the PSI 346 identifies a flow sequence of the RSS information exchanged between the RRA of the terminal device 302 and the RFS 308, 312.

Following step 425, the method 400 proceeds to step 430. In step 430, the FIC 342 monitors and analyzes the RSS feed 316 information. In various exemplary embodiments, parsing occurs before contents are analyzed. Following step 430, the method 400 proceeds to step 435. In step 435, the FIC 342 identifies and extracts useful contents embedded in the RSS feed 316. Following step 435, the method 400 proceeds to step 440 where useful contents embedded in the RSS feed 316 are stored in FIC storage 348.

Following step 440, the method 400 proceeds to step 445. In step 445, an attempt is made by the RIC 344 to correlate the useful content(s) stored in FIC storage 348 with subsequent URL request 352. Following step 445, method 400 proceeds to step 450.

In step 450 a determination is made whether a match exists between the stored useful contents and the subsequent request 352. When a determination is made in step 450 that no match exists, the method 400 proceeds to step 465 where the method 400 stops. Conversely, when a determination is made in step 450 that a match exists, the method 400 proceeds to step 455.

In step 455, a user behavior profile is formulated by the behavior analyzer 336. Following step 455, the method 400 proceeds to step 460. In step 460, the targeted content delivery infrastructure 344 delivers targeted content based on the user behavior profile stored in the behavioral profile database 338 by behavior analyzer 336.

Following step 460, the method 400 proceeds to step 465 where the method 400 stops. It should be apparent that, additional information regarding various steps in method 400 is provided above in connection with the description of functions performed by the various elements in system 300.

Although the various exemplary embodiments have been described in detail with particular reference to certain exemplary aspects thereof, it should be understood that the invention is capable of other different embodiments, and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only, and do not in any way limit the invention, which is defined only by the claims.

What is claimed is:

1. A system for targeted content delivery based on real simple syndication feed analysis, comprising:
    a packet-based communication network in communication with a terminal device, the packet-based communication network comparing flows in a real simple syndication feed to known protocol signatures, identifying one or more matches between the flows of the Real Simple Syndication (RSS) feed and the known protocol signatures, collecting information embedded in the one or more matched flows of the RSS feed that describes content of the one or more matched flows of the RSS feed in a summary fashion, and correlating the collected feed information with a subsequent content request;
    a behavior analyzer that formulates a behavioral profile of a user of the terminal device based upon information collected by means of Deep Packet Inspection (DPI) from the packet-based communication network, the user of the terminal device requesting the RSS feed through the terminal device and receiving the requested RSS feed at the terminal device; and
    a targeted content delivery infrastructure that establishes behavioral profile data regarding the user of the terminal device based upon the formulated behavioral profile and delivers targeted content to the terminal device of the user.

2. The system of claim 1, wherein the packet-based communication network further comprises
    a Protocol Signature Identifier (PSI) that compares flows in the RSS feed to known protocol signatures and identifies one or more matches between the flows of the RSS feed and the known protocol signatures.

3. The system of claim 1, wherein the packet-based communication network further comprises
    a Feed Information Collector (FIC) that performs the collecting information embedded in the one or more matched flows of the RSS feed that describes content of the one or more matched flows of the RSS feed in a summary fashion.

4. The system of claim 1, wherein the packet-based communication network further comprises
    RSS Interest Correlator (RIC) that performs the correlating the collected feed information with the subsequent content request.

5. The system of claim 1, wherein the behavioral profile data includes information selected from the list consisting of a demographic of the user and a psychographic of the user.

6. The system of claim 1, wherein the behavioral profile data includes an interest of the user.

7. The system of claim 1, wherein the targeted content is an advertisement.

8. The system of claim 1, wherein the targeted content delivery infrastructure delivers the targeted content via the Internet.

9. The system of claim 8, wherein the targeted content is delivered via Internet protocol based video.

10. The system of claim 1, wherein the targeted content is delivered via a wireless communications network.

11. The system of claim 1, wherein the collected information is selected from the list consisting of a title of the content of the RSS feed, a synopsis of the content of the RSS feed, and a truncated summary of the content of the RSS feed.

12. The system of claim 11, wherein the collected information further includes:
    a uniform resource locator indicating a location where a full content of the RSS feed is located.

13. The system of claim 1, wherein the content of the RSS feed is selected from the list consisting of a news story, a music file and a video file.

14. The system of claim 1, wherein the packet-based communication network flags the RSS feed with a flag based on the identified one or more matches between the flows of the RSS feed and the known protocol signatures.

15. The system of claim 14, wherein the flag is an indication of a degree of interest of the user.

16. The system of claim 15, wherein the flag is selected from the list consisting of a label and a numerical value.

17. The system of claim 1, wherein a RSS Interest Correlator (RIC) acts as an associated inference analyzer that assists the behavior analyzer as a co-processor.

18. The system of claim 17, wherein the RIC performs a semantic analysis.

19. The system of claim 17, wherein the RIC performs an inference process that involves a uniform resource locator to interest inference lookup.

20. The system of claim 3, wherein the FIC includes storage that stores the collected information.

21. The system of claim 4, wherein the RIC includes storage that stores correlations between the collected feed information and the subsequent content request.

22. The system of claim 1, further comprising:
    a behavioral profile database in which the behavioral profile of the user of the terminal device is stored.

23. A method of targeted content delivery based on real simple syndication feed analysis, comprising:
    collecting relevant user traffic by means of Deep Packet Inspection (DPI) from the packet-based communication network using a Behavioral Information Collector (BIC);
    comparing one or more collected traffic flows of the relevant user traffic to a set of known protocol signatures with a Protocol Signature Identifier (PSI);
    determining that a match exists between the relevant user traffic and the set of known protocol signatures with the PSI;
    identifying a flow sequence of Real Simple Syndication (RSS) information exchange between a RSS reader application and a RSS feed server with the PSI;

monitoring and analyzing the RSS information with a Feed Information Collector (FIC);
identifying and extracting useful contents embedded in the RSS feed with the FIC;
storing the useful contents embedded in the RSS feeds in a FIC storage device;
correlating the stored useful contents with subsequent content requests with the RSS Interest Correlator (RIC);
determining that a match exists between the stored useful contents and the subsequent content requests;
formulating a user behavior profile of a user with a behavior analyzer based upon the useful contents stored in the FIC storage device and the correlations of the RIC; and
delivering targeted content to the user based on the formulated user behavior profile with a targeted content delivery infrastructure.

24. The method of claim 23, wherein identifying and extracting useful contents embedded in the RSS feed further comprises:
parsing the contents.

25. The method of claim 23, wherein correlating further comprises:
periodically pushing stored information regarding one or more interests of the user to the behavior analyzer.

26. The method of claim 23, wherein correlating further comprises:
periodically pulling stored information regarding one or more interests of the user with the behavior analyzer.

* * * * *